(12) United States Patent
Horejsi et al.

(10) Patent No.: US 6,588,189 B2
(45) Date of Patent: Jul. 8, 2003

(54) COMPOUND BEND CHASSIS FRAME FOR A HARVESTING MACHINE

(75) Inventors: Michael J. Horejsi, Sherrard, IL (US); Gary A. Zinser, Jr., Davenport, IA (US)

(73) Assignee: Case Corporation, Racine, WI (US)

( * ) Notice: Subject to any disclaimer, the term of this patent is extended or adjusted under 35 U.S.C. 154(b) by 18 days.

(21) Appl. No.: 09/878,460

(22) Filed: Jun. 11, 2001

(65) Prior Publication Data

US 2002/0089162 A1 Jul. 11, 2002

Related U.S. Application Data

(60) Provisional application No. 60/260,513, filed on Jan. 9, 2001.

(51) Int. Cl.⁷ .................... A01D 46/08; A01D 45/00
(52) U.S. Cl. ................. 56/28; 56/51; 180/311
(58) Field of Search ............ 56/28, 51; 460/119; 180/311, 391, 900; 280/781, 98, 791; 296/203.01, 203.03, 204

(56) References Cited

U.S. PATENT DOCUMENTS

| | | | |
|---|---|---|---|
| 1,544,541 A | | 6/1925 | Lee |
| 1,992,710 A | | 2/1935 | Matthaei ................... 29/152 |
| 2,355,997 A | | 8/1944 | Mueller et al. ............. 78/49 |
| 2,711,341 A | | 6/1955 | Mills et al. ................ 296/28 |
| 4,131,170 A | * | 12/1978 | van der Lely ............. 180/22 |
| 4,709,958 A | | 12/1987 | Harrod ...................... 296/177 |
| D298,433 S | * | 11/1988 | Mikado et al. ............. D15/23 |
| 4,934,449 A | * | 6/1990 | Watt et al. ................ 165/109.1 |
| RE33,769 E | | 12/1991 | Harrod ...................... 296/177 |
| 5,152,364 A | * | 10/1992 | Woods et al. .............. 180/292 |
| 5,174,628 A | | 12/1992 | Hayatsugu et al. ......... 296/188 |
| 5,195,780 A | * | 3/1993 | Inoue et al. ............... 280/834 |
| 5,364,128 A | | 11/1994 | Ide ............................ 280/784 |
| 5,406,779 A | * | 4/1995 | Deutsch et al. ............ 460/119 |
| 5,460,236 A | * | 10/1995 | Lewis et al. ............... 180/253 |
| 5,466,189 A | * | 11/1995 | Deutsch et al. ............ 460/100 |
| 5,988,734 A | | 11/1999 | Longo et al. .......... 296/203.01 |
| 6,039,351 A | * | 3/2000 | Jones et al. ................ 180/359 |
| 6,176,504 B1 | * | 1/2001 | Van Mill et al. ........... 280/444 |
| 6,354,654 B2 | * | 3/2002 | Lee ............................ 296/188 |
| 6,412,818 B1 | * | 7/2002 | Marando .................... 280/781 |

FOREIGN PATENT DOCUMENTS

| | | | |
|---|---|---|---|
| JP | 60-104468 | * | 6/1985 |
| JP | 2-77370 | * | 3/1990 |
| SU | 129464 A | * | 5/1985 |

* cited by examiner

Primary Examiner—Thomas B. Will
Assistant Examiner—Nathan Mammen
(74) Attorney, Agent, or Firm—John William Stader; A. Nicholas Trausch; Rebecca L. Henkel

(57) ABSTRACT

A chassis frame for a self-propelled harvester including a pair of rails extending in side-by-side, spaced relation between forward ends thereof and opposite rearward ends thereof, the rails including compound bend portions adjacent to the rearward ends thereof which extend downwardly and convergingly to a cross member which is connected thereto. A rear axle is connected to the cross member in transverse relation to the rails and has wheels located in wheel cavities defined by the compound bend portions of the rails and pivotable about upright steering axes. The rails of the chassis frame can also include elements for mounting at least one radiator or cooler therebetween forwardly of the bend portions, and elements for mounting at least one radiator or cooler therebetween rearwardly of the bend portions, and an air flow duct can be disposed between the rails to provide a straight air flow path between the radiators or coolers.

13 Claims, 5 Drawing Sheets

COMPOUND BEND CHASSIS FRAME FOR A HARVESTING MACHINE

This application claims the benefit of U.S. Provisional Application No. 60/260,513, filed Jan. 9, 2001.

TECHNICAL FIELD

The present invention generally relates to self-propelled harvesting machines or harvesters for crops such as cotton, corn, and grains, and, more particularly, to an improved chassis frame for a harvester including frame rails having compound bends therein for accommodating the rear steerable wheels of the machine for providing a desired spacing between the wheels and enhanced steerability and maneuverability, and which frame rails allow placement of radiators and/or coolers therebetween to allow straight or nearly straight air flow therethrough for improved operation thereof, as well as other advantages.

BACKGROUND ART

Commonly, self-propelled agricultural harvesting machines, such as cotton harvesters, combines for corn, grains, and the like, have a front or forward end supporting harvesting apparatus which can include, for instance, a plurality of cotton or corn harvesting units supported on a tool bar extending transverse to a fore to aft axis of the harvester, or a grain head, or the like. Such machines typically have drive wheels just aft of the harvesting units or head, a mid-engine, a rear end supported by steerable wheels, and a bin or basket located over the engine and the steerable wheels for receiving the harvested crop.

A common chassis or frame configuration for known self-propelled harvesters includes a pair of spaced longitudinal frame elements or rails extending from adjacent the front of the machine to adjacent the rear of the machine, the driving and steering axles supporting the chassis, and the chassis supporting the other components of the harvester. Typically, the rails are parallel or at a small acute angle to parallel. The rails can comprise straight unitary box beams or channels, or weldments including risers or other elements that extend upwardly or downwardly from the rails. A plurality of cross-members or braces connect the rails at spaced locations along the length thereof to increase rigidity and torsional stability.

It would be desirable to increase the crop carrying capacity of the known self-propelled harvesters to achieve certain advantages, particularly a decrease in the frequency of unloading, without increasing such operational aspects as the turning radius and overall height of the harvester. Turning radius is an important parameter, as it is generally desirable to be able to turn a harvester 180 degrees within the confines of the headlands of an agricultural field, the headlands being desirably maintained as narrow as possible or practical so as to maximize the land area under cultivation. In some artificially irrigated cotton fields in the southwest region of the United States of America, concrete irrigation ditches or canals are located adjacent to the headlands, essentially limiting or fixing their extent. Therefore, any increase in capacity of a harvester achieved, both from the standpoint of number of harvesting units and the size and capacity of the bin or basket, is desirably done without substantially increasing the required turning radius of the harvester. However, a problem in maintaining a desired turning radius of a harvester when attempting to increase bin or basket capacity is that typically, for any significant increase in capacity, tire size must also be increased to safely carry the greater load, and larger tires require greater clearance therearound for turning in the same radius as a smaller tire. As another constraint, since many of the crops to be harvested are grown in rows, and cotton is often grown in raised beds, it is highly desirable, and critical in many instances, for the wheels of the harvester to be spaced apart correspondingly to the spaces between the rows or beds, so as to be driveable therebetween when harvesting to avoid damaging the plants.

In many of the known harvesters, with the engine located beneath the crop receiving bin or basket, the fuel tank is located aft of the engine between the rails, such that air flow for cooling the engine radiator and other heat dissipating components must be drawn or pulled in from the side of the frame at some other location, forward of the fuel tank. Typically, the air flow travels through several radiators or coolers before it is exhausted, and it can be required to be turned between a first bank of the radiators or coolers and a second bank thereof so as to follow an angular path, which has been found to be inefficient and can result in hot spots, that is, areas on some of the radiators or coolers which are hotter than the average temperature thereof or hotter than other regions thereof. Therefore, a desirable improvement in harvesters of this type would be an air flow path which is at least substantially straight and which substantially reduces the occurrence of hot spots.

Accordingly, it would be desirable to provide a chassis frame for a harvester, which provides the advantages and overcomes the shortcomings discussed above.

SUMMARY OF THE INVENTION

According to the invention, a chassis frame for a self-propelled harvester is disclosed. The chassis frame includes a pair of rails extending in side-by-side, spaced relation between forward ends thereof and opposite rearward ends thereof, the rails including compound bends adjacent to the rearward ends thereof which extend downwardly and convergingly to a cross member which is connected thereto.

A rear axle for supporting the rear end of the harvester is connected to the cross member beneath and in transverse relation to the rails, and has steerable wheels located in wheel cavities defined by the compound bends of the rails. The wheels are pivotable about respective steering axes which are upright or oriented at a small acute angle to vertical, the wheel cavities advantageously providing an enhanced or enlarged range of pivotal movement about the steering axis relative to the straight ahead orientation, such that a higher capacity, longer wheel base harvester having larger wheels, utilizing the present chassis frame can turn in the same space as prior known, shorter harvesters. The compound bends and resulting wheel cavities also allow the wheels to be located in relatively small spaced apart relation, for instance, about 80 inches or so, so as to be driveable between rows or beds of cotton plants spaced about 40 inches apart, which is a common row spacing.

The rails of the chassis frame can also include elements for mounting at least one radiator or cooler therebetween rearwardly of the compound bends, and elements for mounting at least one radiator or cooler therebetween forwardly of the bends, to provide a straight rearward to forward air flow path through the chassis frame between the radiators or coolers, thereby eliminating or substantially reducing the occurrence of hot spots.

Further, the rails are preferably each of unitary, continuous construction, and thus eliminate and avoid problems relating to and resulting from stress concentrations found at the angular junctures of prior known welded chassis frames between the frame and risers and other structural members attached thereto.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
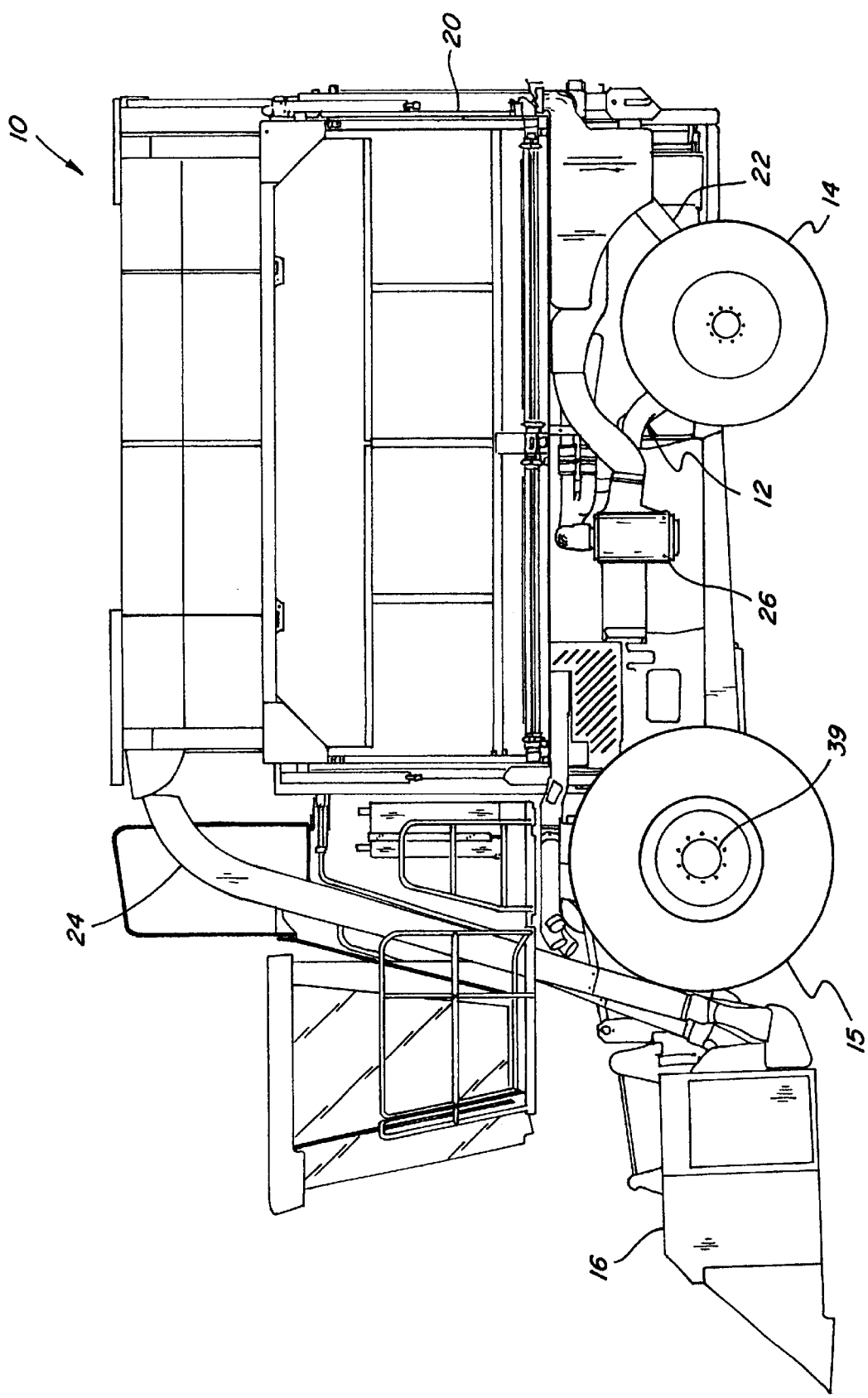
FIG. 1 is a side elevational view of a self-propelled cotton harvester including a chassis frame according to the present invention.

Referring now to the drawings, in FIG. 1 a cotton harvester 10 including a mobile chassis frame 12 constructed according to the present invention is shown. Chassis frame 12 of harvester 10 is supported by a plurality of wheels 14 and 15 for movement over the ground, for harvesting cotton from cotton plants using a plurality of row units 16 mounted to a front or forward end 18 of chassis frame 12 (FIG. 2), in the well known, conventional manner. Cotton harvester 10 includes a large, rectangular shape basket 20 supported on a rearward end 22 and forward end 18 (FIG. 4) of chassis frame 12 for receiving and collecting cotton harvested by row units 16, the cotton being blown from the row units to basket 20 through a plurality of ducts 24 by fans (not shown) also in the well known, conventional manner.

Harvester 10 is propelled by an internal combustion engine 26, connected in driving relation to some or all of wheels 14 and 15 either through a conventional mechanical transmission and drivetrain, and/or hydraulically through a pump or pumps fluidly connected to hydraulic wheel motors 28 attached to wheels 14 (FIG. 3), in the conventional manner. Here, it should be recognized and understood that although chassis frame 12 is shown in association with a self-propelled cotton harvester 10, frame 12 likewise has utility for use on harvesters for a wide variety of other plants and crops, including, but not limited to, grains and corn.

Figure 2:
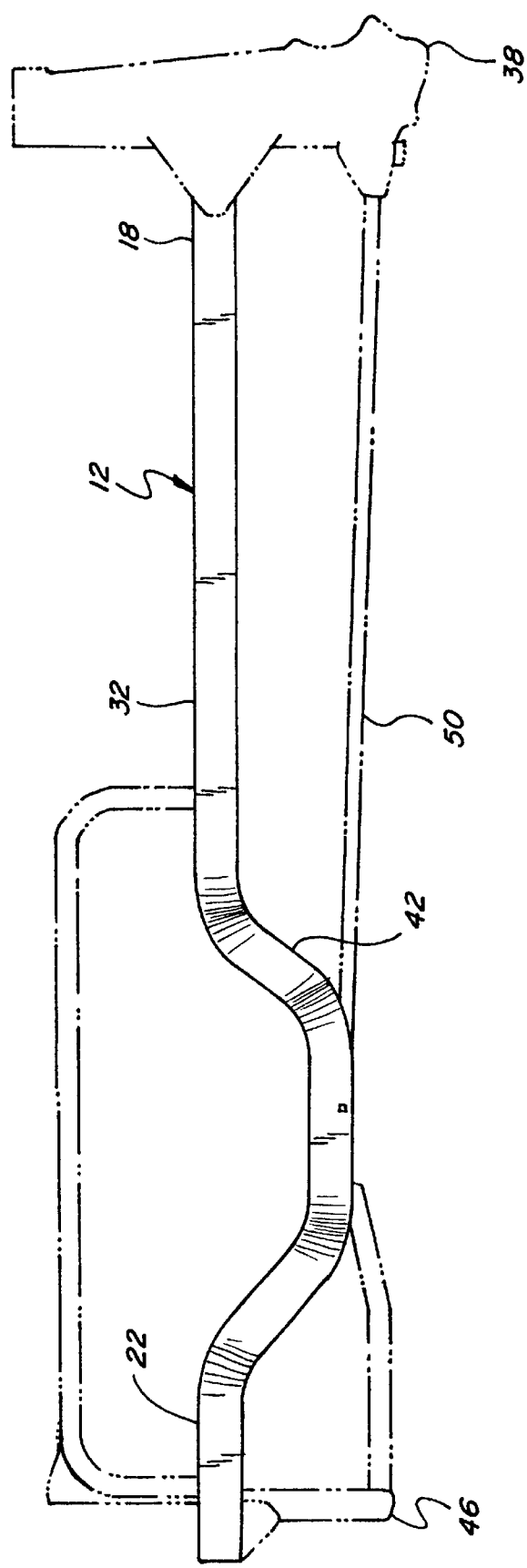
FIG. 2 is an enlarged side elevational view of the chassis frame of FIG. 1, showing a compound bend portion thereof, and showing other structural elements of the harvester in phantom.
Figure 3:
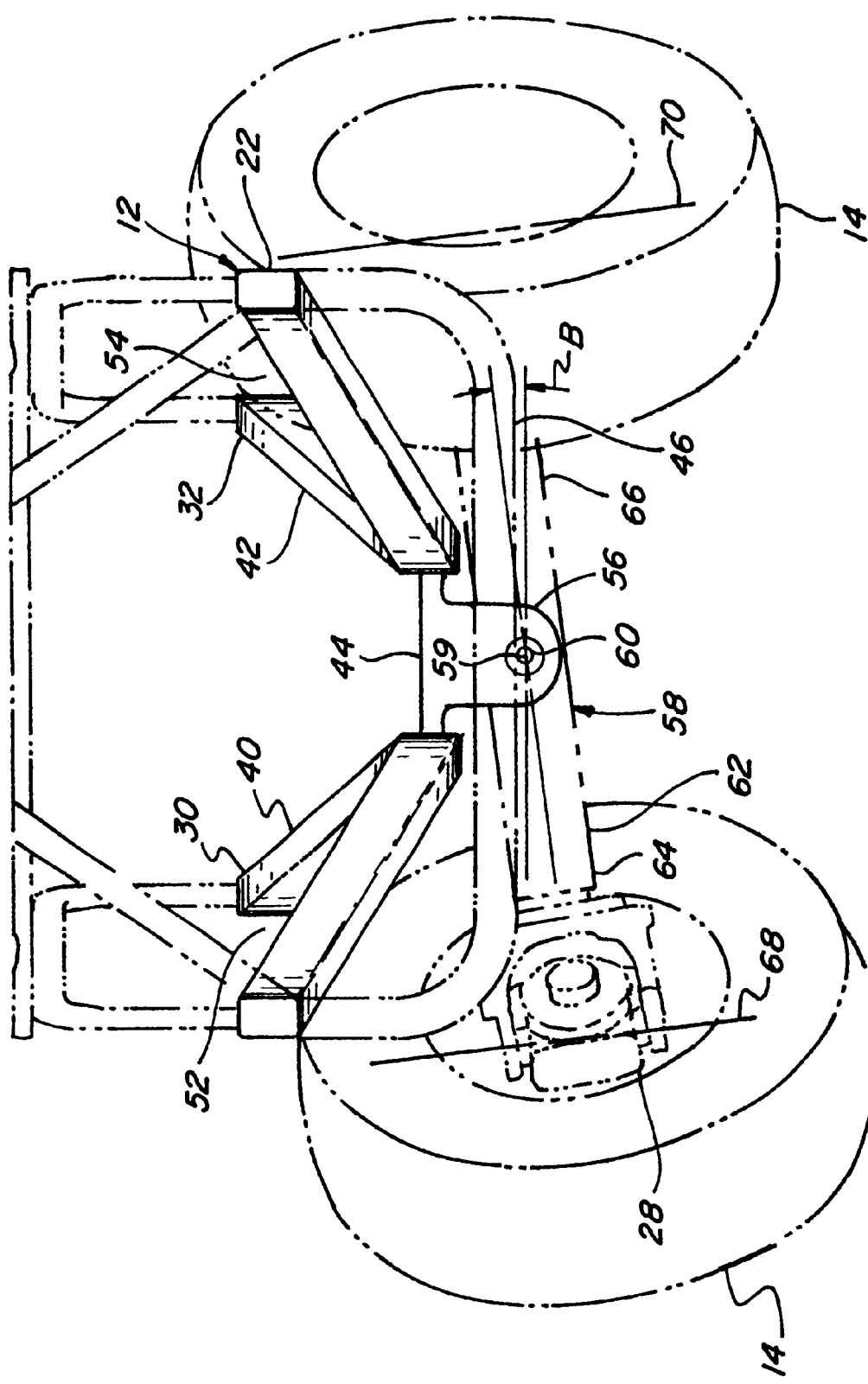
FIG. 3 is an enlarged rear end view of the chassis frame of FIG. 1, showing a cross member connected between rails thereof, and elements of a rear axle assembly of the harvester shown in phantom mounted in pivotal relation thereto.
Figure 4:
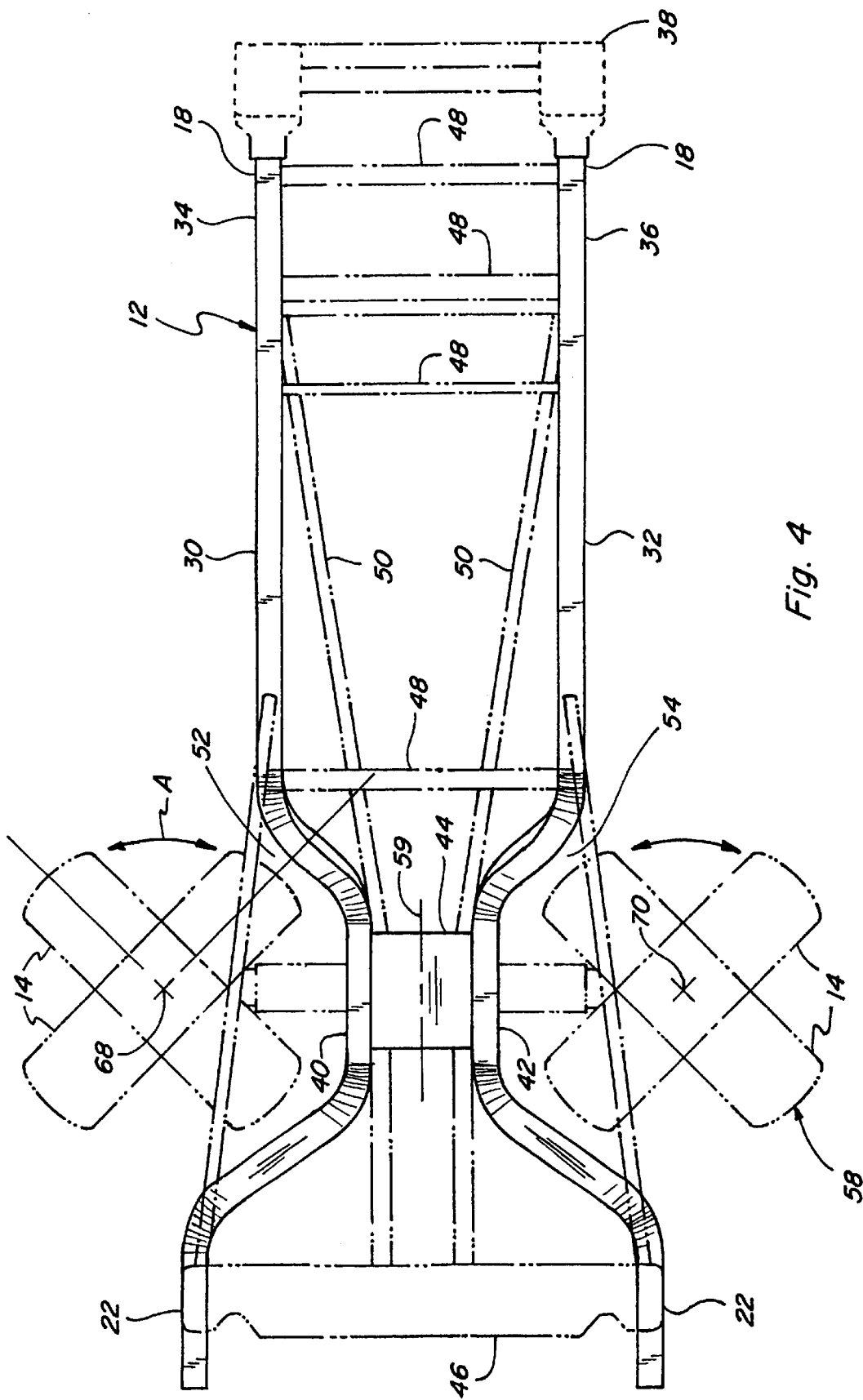
FIG. 4 is an enlarged top view of the chassis frame of FIG. 1, showing the other structural elements of the harvester associated therewith in phantom.

Turning to FIGS. 2, 3, and 4, chassis frame 12 is shown oriented oppositely with respect to the orientation thereof shown in FIG. 1, that is, facing the opposite direction. Chassis frame 12 includes a pair of elongate rails 30 and 32 which extend generally horizontally in side-by side, spaced relation one to the other, from forward end 18 of chassis frame 12 to rearward end 22 thereof. Each rail 30, 32 is preferably of rectangular tubular cross section and is preferably made of a suitably rigid, strong material such as a steel or other metal. Rails 30, 32 include forward portions 34, 36, respectively, which connect to a forward structural member 38 of chassis frame 12 at forward end 18 thereof, structural member 38 being adapted for mounting on or to a front axle assembly 39 including the forwardly located wheels 15 (FIG. 1) which are the main drive wheels and support the forward end of harvester 10 and row units 16.

Forward portions 34, 36 extend from forward end 18 in a rearward direction toward rearward end 22. Rails 30, 32 include compound bend portions 40, 42 preferably integral or unitary with forward portions 34, 36, which compound bend portions 40, 42 extend rearwardly from forward portions 34, 36, downwardly and convergingly, that is, progressively closer one relative to the other, to a cross member 44 which connects compound bend portions 40, 42 together. Compound bend portions 40, 42 extend rearwardly from cross member 44 upwardly and divergingly, that is, progressively farther apart one relative to the other, to rearward end 22. Rails 30, 32 are connected together at rearward end 22 by a U shape rear structural member 46, and at other locations along the length thereof by additional cross members 48 and braces 50 for increasing the stiffness and torsional rigidity thereof. Compound bend portions 40, 42 each have a concave shape when viewed from above (FIG. 4), which define sidewardly facing wheel cavities 52, 54, respectively, for at least partially receiving the rearwardly located wheels 14, as best shown in FIGS. 3 and 4.

Referring more particularly to FIG. 3, cross member 44 includes a downwardly extending yoke 56 to which a rear axle assembly 58 is mounted for pivotal movement about a generally horizontal axis 59 by a pin 60 through a predetermined range of pivotal movement of about 7 degrees either up or down relative to horizontal, to positions including the position illustrated. Axle assembly 58 includes a rear axle 62 located beneath and extending transversely or across compound bend portions 40, 42, which axle 62 has opposite transverse ends 64, 66, respectively, to which are mounted the rear wheels 14. Rear wheels 14 are steerable and are mounted to ends 64, 66 by conventional kingpin joints and hydraulic wheel motors 28 in the conventional manner for pivotal or steering movement about steering axes 68, 70, respectively, which axes 68, 70 are generally upright or oriented at a small acute angle to vertical (as shown) depending on the pivotal position of rear axle 62 about axis 59.

As is evident from FIGS. 3 and 4, an advantage achieved by compound bend portions 40, 42, is the capability to locate the rear wheels 14 in a desired relatively small spaced apart relation, such as 80 inches as shown, for driving between beds of cotton plants, while allowing the rear wheels 14 to pivot or rotate within a large range of pivotal movement about axes 68, 70, respectively, which range is preferably at least about 80 degrees of motion and more preferably about 90 degrees of motion, as shown and denoted by arrow A. This is an important capability as it allows harvester 10 to be greater in length between the forward and rear ends thereof compared to many known harvesters having a 75 degree or less range of steering motion, without increasing the overall turning radius of the harvester, so as to still be effectively turnable and maneuverable in short headlands and other small areas. The greater length is desirable as it enables basket 20 to be longer and thus have greater capacity, and it allows harvester 10 to have a longer wheel base and the rearward steerable wheels 14 to be located farther rearward of row units 16, so that it is easier to steer and guide harvester 10 through fields. When the size and capacity of basket 20 is increased, it is typically required or desired to use correspondingly larger size rear wheels 14 so as to be capable of better carrying the resulting increased weight. It is also typically desired for wheels 14 to have a relatively large treads for providing traction when those wheels are powered. Referring to FIG. 3, another advantage achieved by the compound bend portions 40, 42 is the relatively large size and capacity of wheel cavities 52 and 54 for receiving larger size wheels 14, and for providing clearance for wheels 14 to pivot throughout their range of movement about their axes 68, 70, including while axle assembly 58 is pivoted throughout its range of movement about horizontal axis 60, without wheels 14 contacting compound bend portions 40, 42, as illustrated. Here, axle assembly 58 is shown pivoted about pin 60 in one direction about 6.5 degrees from horizontal, as denoted by angle B, which close to its maximum amount of pivotal movement in that direction, axle assembly 58 being pivotable in the opposite direction from horizontal by the same amount, for a total range of pivotal movement of about 13 degrees. This is advantageous as it allows wheels 14, which as illustrated have a 54 inch outer diameter, to be steered within their full range of steering movement while harvester 10 is traversing irregular and uneven terrain and axle assembly 58 is moved through its range of pivotal movement about pin 60. In comparison, one prior known cotton harvester, Model 2555 made by Case Corporation, includes a straight rail chassis frame, and has 46 inch outer diameter tires, which can only be turned within a range of about 68 degrees, with maximum pivotal movement of the axle assembly connected to the wheels being limited to about 4.5 degrees in either direction from horizontal, for a total range of pivotal movement of about 9 degrees.

Figure 5:
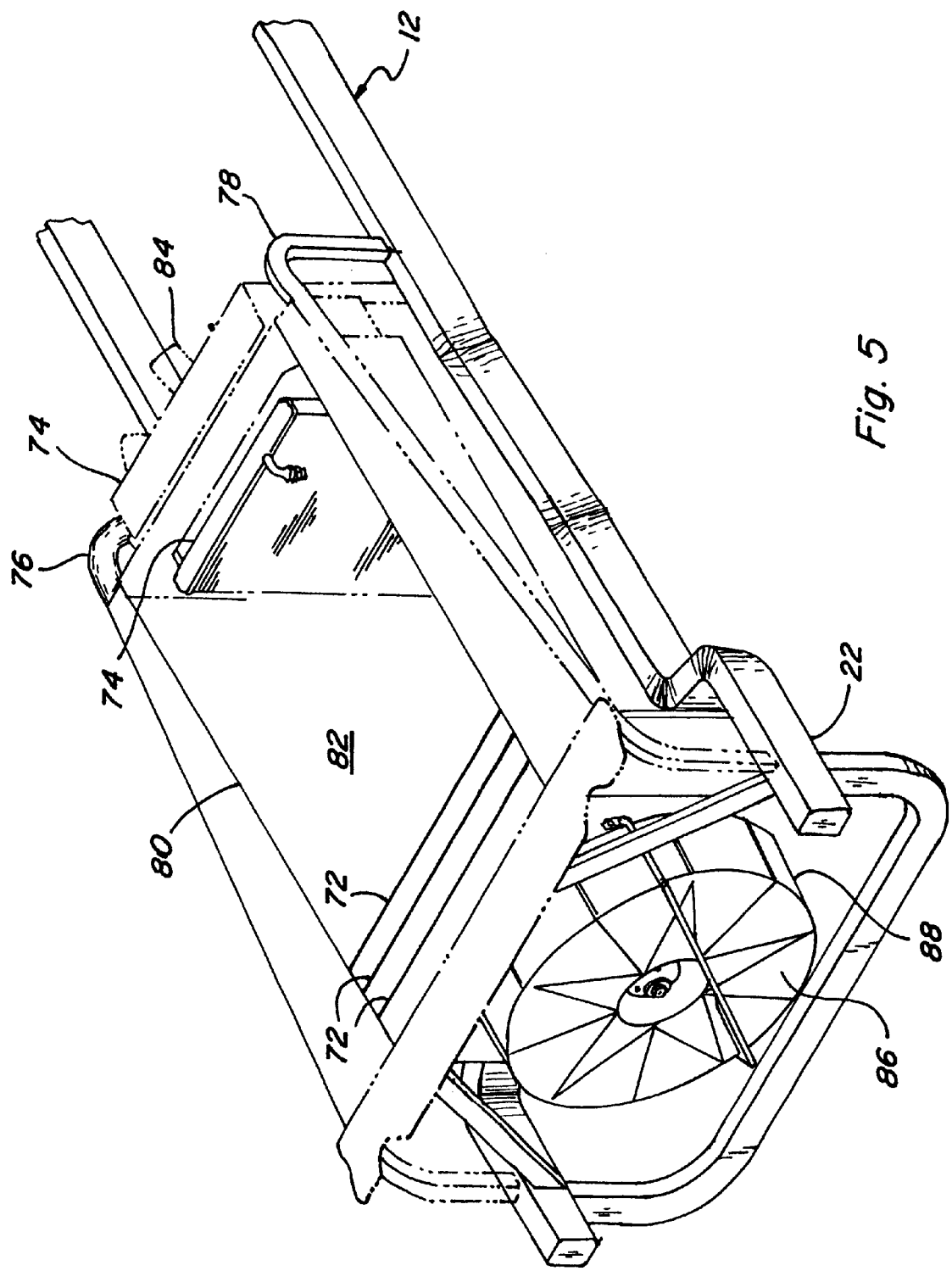
FIG. 5 is a fragmentary perspective view of the chassis frame, in association with a cooling fan assembly mounted to a rearward end thereof, radiators mounted aft and fore of the compound bend portions of the rails thereof, and elements of an air flow duct disposed between the compound bend portions.

Referring also to FIG. 5, chassis frame 12 supports a plurality of rear coolers or radiators 72 aft or rearwardly of compound bend portions 40, 42, and a plurality of front coolers or radiators 74 forwardly thereof, on brackets 76 and 78 or other suitable members. An air flow duct 80 (the top of which is removed for clarity) is supported on brackets 76, 78 and substantially encloses a space between and above compound bend portions 40, 42 to define a substantially straight air flow passage 82 extending between the rear and front coolers or radiators 72, 74. A fan 84 is mounted to the engine or frame 12 forwardly of forward radiators 74, and is operable for drawing air through a rearwardly located air inlet 86, rear radiators 72, passage 82, and front radiators 74, for removing heat from the radiators. Because of the straightness of the path provided for the air flow, the air flow is relatively evenly distributed over the faces of the radiators and evenly removes heat therefrom. Also, the separation of the rear and front radiators 72, 74 contributes to this latter capability, such that it has been found that the occurrence of hot spots is significantly reduced compared to the known angularly related radiator arrangements. Additionally, the rate of the air flow achievable is increased, to about 14,000 cubic feet per minute (CFM), verses about 10,000 CFM achievable with prior known systems such as that used on the Case Model 2555, due to the straight air flow path, and to the ability to use radiators and coolers having greater frontal area or size as a result of the relatively large size of the space between rails 30 and 32 compared to the sizes of spaces available for radiators in the sides of prior known harvesters.

The radiators 72 and 74 are connected to and comprise parts of various systems of harvester 10, which can include, but are not limited to, a charge air system, an air conditioning system, a fuel system, the hydraulic system, and the cooling system for engine 26, it having been found that by placing the radiators from which the greater heat must be removed or dissipated in the rearward locations, that is, closer to air inlet 86, better cooling efficiency and longer service life of the affected components is achieved, compared to prior known arrangements wherein all of the radiators are placed together or are oriented angularly one relative to the other wherein the air flow must turn between two sets of radiators. Another advantage achieved by utilizing a rearwardly located air inlet 86 and a straight rearward to forward air flow, particularly for cotton harvesters such as harvester 10, is that the cleaning interval for the coolers 72 and radiators 74 is extended. The fine mesh size of the rotary screen 88 prevents most lint and airborne crop debris from entering the airflow duct 80. Any small particles of lint, dust and debris that do pass into the air duct 80 flow more efficiently through the coolers 72 and 74 due to the straight air flow rather than wedging or clogging in the coolers as happens in designs where the air flow makes turns to flow through the coolers. To illustrate, the coolers 72 and radiators 74 have been found to require cleaning only once during the harvesting season, which, in comparison to the required cleaning about twice a week for coolers in machines with air inlet screens located on the sides of other known harvesters, is a substantial improvement.

As another advantage of the present invention, it should also be appreciated that by providing compound bend portions 40 and 42 and making rails 30 and 32 integral or unitary, numerous welds and other joints commonly used in prior known frame constructions and for attaching risers and other structural members are eliminated, thus resulting in a less complex chassis frame 12 which is subject to fewer stress concentrations and the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A chassis frame for a self-propelled harvester, the harvester including a forward end for supporting apparatus for harvesting crops and a rear end for supporting apparatus for receiving and holding a quantity of the harvested crops, the chassis frame comprising:

a pair of rails extending separately in side-by-side, spaced apart relation between forward ends thereof for supporting the forward end of the harvester and opposite rearward ends thereof for supporting the rear end of the harvester, the rails including compound bend portions adjacent to the rearward ends thereof which extend downwardly and convergingly to a cross member which is connected thereto for connection to a rear axle of the harvester, further comprising at least one forward radiator mounted between the rails forwardly of the bend portions thereof, and at least one rear radiator mounted between the rails rearwardly of the bend portions thereof.

2. The chassis frame of claim 1 further comprising a rear axle connected to the cross member in transverse relation to the rails for pivotal movement relative thereto about a generally horizontal pivotal axis.

3. The chassis frame of claim 2, wherein the compound bend of each of the rails defines a sidewardly facing wheel cavity, and the rear axle includes opposite transverse ends located in the wheel cavities, respectively, each of the transverse ends having a wheel mounted thereto for pivotal movement about a generally upright steering axis within a predetermined range of pivotal movement, the wheel cavities being of sufficient size to allow pivotal movement of the wheels about the steering axes throughout the predetermined range of pivotal movement thereof while the rear axle is pivoted about the horizontal pivotal axis.

4. The chassis frame of claim 1, wherein the rails include elements for mounting the at least one radiator or cooler therebetween forwardly of the bend portions of the rails, and elements for mounting the at least one radiator or cooler therebetween rearwardly of the bend portions of the rails.

5. The chassis frame of claim 1, further comprising walls disposed between the bend portions of the rails defining a passage for the flow of air from the at least one rear radiator to the at least one forward radiator.

6. The chassis frame of claim 5, further comprising a fan for generating the flow of air through the passage.

7. A self-propelled harvester, comprising:

a forward end;

a rearward end opposite the forward end;

a chassis frame including a pair of rails extending separately and generally horizontally in side-by-side, spaced apart relation between the forward end and the rearward end, the rails including compound bends adjacent to the rearward end which extend downwardly and convergingly to a cross member which connects to the rails, each of the compound bends defining a sidewardly facing wheel cavity;

a rear axle assembly mounted to the cross member, the axle assembly including an axle extending across and beneath the compound bends of the rails, and wheels mounted to opposite ends of the axle for pivotal movement at least partially within the wheel cavities about generally upstanding axes, respectively, further comprising at least one rear radiator mounted between the rails rearwardly of the compound bends and at least one forward radiator mounted between the rails forwardly of the compound bends.

8. The self-propelled harvester of claim 7, wherein the rear axle assembly is mounted to the cross member for pivotal movement through a predetermined range of pivotal movement about a generally horizontal axis, and each of the wheels is pivotable about one of the generally upstanding axes through a range of at least about 80 degrees while the rear axle assembly is pivoted through the predetermined range of pivotal movement.

9. The self-propelled harvester of claim 7, further comprising an air flow duct extending between the rear and forward radiators.

10. The self-propelled harvester of claim 9, further comprising a fan disposed for producing an air flow through the radiators and the air flow duct.

11. The self-propelled harvester of claim 7, wherein each of the rails is a continuous unitary member.

12. The self-propelled harvester of claim 7, wherein the chassis frame supports at least one harvesting unit adjacent to the forward end, a container above the rear end for receiving and holding crops harvested by the at least one harvesting units, and an internal combustion engine for propelling the harvester.

13. The self-propelled harvester of claim 9, wherein the rear axle assembly is mounted to the cross member for pivotal movement relative thereto about a generally horizontal axis and each of the wheels is pivotable within a predetermined range of pivotal movement throughout a range of pivotal movement of the rear axle assembly.

* * * * *